(12) United States Patent
Hart

(10) Patent No.: US 8,352,630 B2
(45) Date of Patent: *Jan. 8, 2013

(54) DYNAMIC CLASSIFICATION AND GROUPING OF NETWORK TRAFFIC FOR SERVICE APPLICATION ACROSS MULTIPLE NODES

(75) Inventor: Justin Scott Hart, Purton (GB)

(73) Assignee: Sonus Networks, Inc., Westford, MA (US)

( * ) Notice: Subject to any disclaimer, the term of this patent is extended or adjusted under 35 U.S.C. 154(b) by 231 days.

This patent is subject to a terminal disclaimer.

(21) Appl. No.: 12/873,941

(22) Filed: Sep. 1, 2010

(65) Prior Publication Data

US 2012/0054363 A1 Mar. 1, 2012

(51) Int. Cl.
*G06F 15/16* (2006.01)
(52) U.S. Cl. .................................. 709/232; 370/395.21
(58) Field of Classification Search ................. 709/205, 709/232; 370/230, 230.1, 231, 395.21
See application file for complete search history.

(56) References Cited

U.S. PATENT DOCUMENTS

| | | | |
|---|---|---|---|
| 6,452,915 B1 | 9/2002 | Jorgensen | 370/338 |
| 6,542,508 B1 | 4/2003 | Lin | 370/395.43 |
| 6,591,299 B2 | 7/2003 | Riddle et al. | 709/224 |
| 2002/0116545 A1* | 8/2002 | Mandato et al. | 709/328 |
| 2004/0063497 A1* | 4/2004 | Gould | 463/42 |
| 2006/0159017 A1* | 7/2006 | Mun et al. | 370/230 |
| 2007/0109965 A1* | 5/2007 | Davis | 370/230.1 |
| 2007/0211746 A1* | 9/2007 | Oshikiri et al. | 370/437 |
| 2007/0220588 A1 | 9/2007 | Panda et al. | 726/1 |
| 2007/0297329 A1* | 12/2007 | Park et al. | 370/230.1 |
| 2008/0192629 A1* | 8/2008 | Chari | 370/230 |
| 2008/0192753 A1 | 8/2008 | Li | 370/395.21 |
| 2008/0201722 A1 | 8/2008 | Sarathy | 719/311 |
| 2009/0042537 A1* | 2/2009 | Gelbman et al. | 455/406 |
| 2009/0176500 A1* | 7/2009 | Panico et al. | 455/446 |
| 2009/0182874 A1* | 7/2009 | Morford et al. | 709/224 |
| 2009/0190592 A1 | 7/2009 | Hsieh et al. | 370/392 |
| 2009/0216729 A1* | 8/2009 | Kester et al. | 707/3 |

(Continued)

FOREIGN PATENT DOCUMENTS

WO   WO 2009142854 A2 * 11/2009

OTHER PUBLICATIONS

Kounavis et al., "Two stage packet classification using most specific filter matching and transport leveling," *Science Direct*, vol. 51 (2007), pp. 4951-4978.

(Continued)

*Primary Examiner* — Wing F Chan
*Assistant Examiner* — Kostas Katsikis

(57) ABSTRACT

Methods and apparatuses, including computer program products, are described for applying service based on classification and grouping of traffic flows. The method includes receiving a traffic flow, and matching the traffic flow to classification groups. The matching includes determining a first event associated with the traffic flow, comparing attributes of the first event with entry criteria of the classification groups, and assigning the first event to one or more classification groups where the first event meets the entry criteria of the one or more classification groups. The method includes identifying one or more service definitions for the traffic flow based on the classification groups assigned to the traffic flow, reconciling the one or more service definitions for the traffic flow, and providing a service to the traffic flow based on the reconciled service definitions.

38 Claims, 8 Drawing Sheets

U.S. PATENT DOCUMENTS

| | | | |
|---|---|---|---|
| 2009/0227231 A1 | 9/2009 | Hu et al. | 455/410 |
| 2009/0232015 A1 | 9/2009 | Domschitz et al. | 370/252 |
| 2009/0268720 A1 | 10/2009 | Veenstra et al. | 370/352 |
| 2009/0312046 A1* | 12/2009 | Clevenger et al. | 455/522 |
| 2010/0031323 A1 | 2/2010 | Wiryaman et al. | 726/4 |
| 2010/0183306 A1* | 7/2010 | Pangrac et al. | 398/72 |
| 2012/0084184 A1* | 4/2012 | Raleigh et al. | 705/30 |

OTHER PUBLICATIONS

Cisco Systems, "Diffserv—The Scalable End-to-End Quality of Service Model," (Aug. 2005), 18 pages.

* cited by examiner

DYNAMIC CLASSIFICATION AND GROUPING OF NETWORK TRAFFIC FOR SERVICE APPLICATION ACROSS MULTIPLE NODES

FIELD OF THE INVENTION

The subject matter of this application relates generally to methods and apparatuses, including computer program products, for dynamic classification and grouping of network traffic for service application across multiple nodes.

BACKGROUND OF THE INVENTION

In the field of telecommunications, it is common for different classes of network traffic to exist. Network traffic is classified by a variety of means. A common example is traffic belonging to a particular subscriber to the network. Subscribers are grouped into different classifications for a variety of reasons, including, but not limited to, the level of service purchased (minutes, bandwidth, features etc), their location/geography, the type of handset/user equipment (UE) utilized, the business or enterprise to which they belong, or the network segment/server or point-of-interconnect to which they are assigned/attached.

Different nodes in the network may have lesser or greater (or even completely different) knowledge about these classifications. Generally, it is incumbent upon the network provider to manually manage the subscriber classification definitions on each node to ensure that a subscriber's traffic flow receives common treatment regardless of which node it traverses. For example, network operators may be required to pre-configure (static) data to define these groups and allocate subscribers to these groups, thus incurring an Operations, Administration, and Management (OA&M) cost to set up a subscriber and again each time a service or subscriber changes.

In addition, classifications/grouping constructs within a network node's data model typically have a fixed meaning (as determined by the equipment vendor's software), and may not match the network operator's view of how it classifies subscribers or defines services. As a result, equipment vendors either develop custom software for network operators, or the network operator compromises its desired classification schema (in terms of costs, efficiencies, or quality of service delivered).

Also, classification/grouping data models are frequently flat or hierarchical, which can make it difficult to have subscribers belong to multiple classifications simultaneously. In a network that includes software from multiple vendors (e.g., a mixed vendor network), data models between nodes are frequently different. Thus, a network operator may have difficulty defining a consistent classification and service view for a given subscriber or service across all the equipment through which the subscriber's service is delivered.

Another difficulty with traffic classification arises when more than one network node (such as a border/edge device and a centralized session device) each have different information about the traffic flow available based on the specific scope of signaling or configuration to which the network nodes are exposed. In some cases, the decision to apply a service can be reasonably made based on the information available at just one of the nodes. However, situations can occur where information available individually to each node must be combined in order to make the most optimal service decision for the traffic flow and/or subscriber.

A common approach to these difficulties is to continuously add specific data items into the signaling protocols connecting the network nodes such that sufficient information is available to whichever node needs to make a decision for that specific subscriber or service. However, this approach can require frequent incremental changes to each node involved such that services can be slow and/or costly to introduce to a network. This approach can also result in traffic flow classification and service application decisions based on incomplete information, simply because that is what is available, which leads to inefficiencies, inaccuracies or undesirable user experiences.

FIG. 1 is a block diagram of a prior art system 100 for receiving traffic flows at a session border controller 110 ("SBC") from user equipment 105a-c ("UE") for transmission to an application server 120. Generally, the application server 120 is unaware of much of the physical topology of the network(s) the UEs 105a-c are using. For example, the topology may be masked from the application server 120 due to a network security implementation. Also, the application server 120 may not be aware of information that the SBC 110 is aware of (e.g., the actual transport protocol the UEs 105a-c use, the original application protocol the UEs 105a-c use to connect to the SBC 110). Conversely, the application server 120 may be aware of information that the SBC 110 is not aware of. For example, the operator of the network can provision a richer data model at the application server 120 regarding the details of the subscriber and the services they utilize, than can be provisioned at the SBC 110.

The physical separation of roles between the SBC 110 and the application server 120 has a number of benefits (e.g., security, scalability, processing efficiency), but the physical separation can make it harder to determine the optimum service match for traffic flows as a result of the different information available to the SBC 110 and the application server 120. For example, a network operator may intend to record all calls received from a particular access network segment, on which one of the UEs (e.g., User Equipment A 105a) is located. However, the application server 120 is the node which is connected to the recording platform, yet the SBC 110 is the node that knows the specific access network segment on which the UE 105a is located and from which the traffic flow originated.

Therefore, a need exists for a flexible and dynamic technique for classifying traffic flows into groups and applying service to the traffic flows based on the classification groups across multiple nodes in a network.

SUMMARY OF THE INVENTION

In general overview, the techniques described herein are related to applying service based on classification and grouping of traffic flows across multiple nodes. The techniques advantageously provide for configuration of abstract classifications that are not strictly bound to other elements within a data model. In addition, the techniques provide for dynamic evaluation of the network traffic among a number of different nodes in a network to learn the classification(s) to which a subscriber or traffic flow belongs, and to apply service based on the classification(s). This dynamic evaluation can be achieved by matching the content of signaling or media exchanged with some pre-defined pattern or criteria—particularly where the pattern or criteria includes stateful information related to a sequence of events. The techniques also allow for binding, into a group, sets of subscribers or traffic flows that match a specified classification. Common service treatment can be provided to that group, and the service treatment can occur at a different node than the node at which group classification occurs.

The techniques further provide for continued evaluation of matching criteria to determine whether the group membership of a subscriber or other entity should change. The change can include addition or deletion of group membership. The techniques also provide for the transmittal of an indication of membership between nodes, such that a node farther along the traffic route is able to modify group membership or apply service to a traffic flow based on the indication of membership received.

The invention, in one aspect, features a method for applying service based on classification and grouping of traffic flows across multiple nodes. The method includes receiving, at a first network server, a traffic flow, and matching, at the first network server, the traffic flow to classification groups. The matching includes comparing attributes of the traffic flow with entry criteria of the classification groups, assigning the traffic flow to one or more classification groups where the attributes of the traffic flow meet the entry criteria of the one or more classification groups, and applying an indication of membership in the one or more classification groups to the traffic flow. The method includes transmitting, by the first network server, the traffic flow to a second network server, wherein the traffic flow includes the indication of membership. The method also includes identifying, at the second network server, one or more service definitions for the traffic flow based on the indication of membership applied to the traffic flow by the first network server, and providing, at the second network server, a service to the traffic flow based on the one or more identified service definitions.

The invention, in another aspect, features a system for applying service based on classification and grouping of traffic flows across multiple nodes. The system includes a first network server configured to receive a traffic flow, and match the traffic flow to classification groups. The matching includes comparing attributes of the traffic flow with entry criteria of the classification groups, assigning the traffic flow to one or more classification groups where the attributes of the traffic flow meet the entry criteria of the one or more classification groups, and applying an indication of membership in the one or more classification groups to the traffic flow. The system includes a second network server configured to receive the traffic flow from the first network server, identify one or more service definitions for the traffic flow based on the indication of membership applied to the traffic flow at the first network server, and provide a service to the traffic flow based on the one or more identified service definitions.

In some embodiments, any of the above aspects can include one or more of the following features. In some embodiments, the indication of membership includes a list of indicia associated with the one or more classification groups assigned to the traffic flow. In some embodiments, the list of indicia is in at least one of: an XML body, a plain text body, native SIP headers, or native SIP fields. In some embodiments, the traffic flow is matched at the second network server to one or more additional classification groups based on the indication of membership, and one or more additional service definitions for the traffic flow are identified at the second network server based on the one or more additional classification groups assigned to the traffic flow.

In some embodiments, the identified service definitions for the traffic flow are reconciled at the second network server. Reconciling the identified service definitions for the traffic flow includes configuring logic of the identified service definitions to manage interactions between the service definitions. In some embodiments, providing a service to the traffic flow includes executing logic associated with the service definitions identified for the traffic flow.

In some embodiments, the traffic flow is automatically assigned at the second network server to one or more additional classification groups based on the indication of membership. Automatically assigning the traffic flow to one or more additional classification groups can be based on instructions in the one or more classification groups associated with the indication of membership.

In some embodiments, the traffic flow is automatically excluded at the second network server from one or more additional classification groups based on the indication of membership. Automatically excluding the first event from one or more additional classification groups can be based on instructions in the one or more classification groups associated with the indication of membership.

In some embodiments, attributes of the traffic flow are compared at the second network server with entry criteria of one or more additional classification groups, the traffic flow is assigned at the second network server to the one or more additional classification groups where the attributes of the traffic flow meet the entry criteria of the one or more additional classification groups, and the indication of membership is modified at the second network server based on assignment of the traffic flow to the one or more additional classification groups. In some embodiments, the indication of membership is based on service provided to the traffic flow at the first network server.

In some embodiments, the traffic flow includes a first event. The first event can be the start of a sequence of events. In some embodiments, the matching further includes analyzing a second event associated with the traffic flow to determine whether the second event is related to the first event, and assigning the second event to the one or more classification groups assigned to the first event.

In some embodiments, attributes of the second event are compared with a list of members belonging to the one or more classification groups, wherein the first event is assigned to a member in the list of members. In some embodiments, attributes of the second event are compared with entry criteria of one or more additional classification groups, and the second event is assigned to the one or more additional classification groups where the second event meets the entry criteria of the one or more additional classification groups. For processing of the second event, the one or more additional classification groups can override the classification groups previously assigned to the second event.

In some embodiments, the second event is excluded from one or more of the classification groups assigned to the first event based on assignment of the second event to the one or more additional classification groups. In some embodiments, wherein the first event is the start of a sequence of events, the matching further includes binding the sequence of events to the one or more classification groups assigned to the first event, and assigning subsequent events in the sequence of events to the one or more classification groups assigned to the first event. Binding the sequence of events to the one or more classification groups can include generating a data structure in each classification group of the one or more classification groups, wherein the data structure includes a reference to the sequence of events.

In some embodiments, wherein the first event is the start of a sequence of events, the matching further includes instantiating a context control block upon determining the first event, storing indicia associated with the classification groups assigned to the first event in the context control block, analyzing, based on the stored indicia, subsequent events in the sequence of events associated with the traffic flow to determine whether the subsequent events are related to the first event, assigning the subsequent events to the one or more classification groups assigned to the first event and stored in the context control block, and applying an indication of membership in the one or more classification groups to the subsequent events. In some embodiments, the subsequent events are assigned to one or more additional classification groups where attributes of the first event and attributes of the subsequent events are combined to meet entry criteria of the one or more additional classification groups, and an indication of membership in the one or more additional classification groups is applied to the subsequent events.

In some embodiments, the stored indicia are modified based on the analysis of the subsequent events. In some embodiments, the classification group assignment of the subsequent events is modified based on the analysis of the subsequent events. Modifying the classification group assignment of the subsequent events can include adding the subsequent events to one or more additional classification groups, removing the subsequent events from one or more of the classification groups previously assigned to the subsequent events, or both. Modifying the classification group assignment of the subsequent events can include modifying the indication of membership applied to the subsequent events.

In some embodiments, the context control block includes a finite state machine and a context. In some embodiments, comparing attributes of the traffic flow with entry criteria of the classification groups includes identifying one or more characteristics associated with the traffic flow, comparing the identified characteristics to the entry criteria, and determining whether the identified characteristics match the entry criteria.

In some embodiments, the first network server and the second network server receive data associated with the classification groups and service definitions from a policy configuration server. The entry criteria of the classification groups can include one or more of: rules for determining membership in the classification groups, parameters for determining membership in the classification groups, policies for determining membership in the classification groups, and patterns for determining membership in the classification groups. Attributes of the traffic flow can include signaling data, media type data, media content data, state data, or any combination thereof.

In some embodiments, applying the indication of membership includes inserting, at the first network server, data associated with the indication of membership into the signaling content of the traffic flow. In some embodiments, the classification groups are independent of each other. In some embodiments, the classification groups are independent of the service definitions. In some embodiments, the first network server and the second network server each include a user interface, the user interface receiving configuration instructions for the classification groups. The user interface can include a display for viewing the classification groups and related configuration.

DETAILED DESCRIPTION

Figure 1:
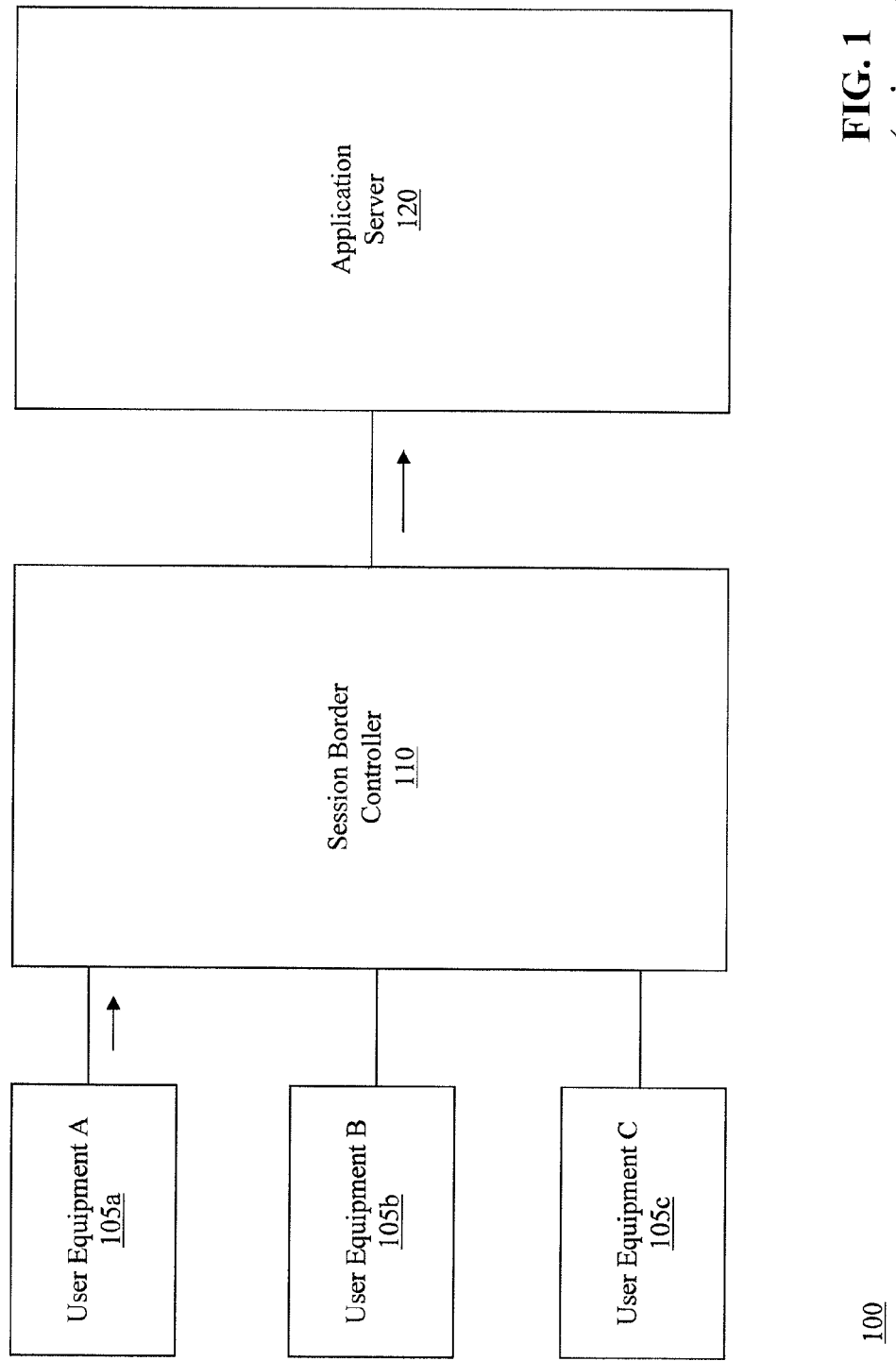
FIG. 1 is a block diagram of a prior art system for receiving traffic flows at a session border controller from user equipment for transmission to an application server.
Figure 2:
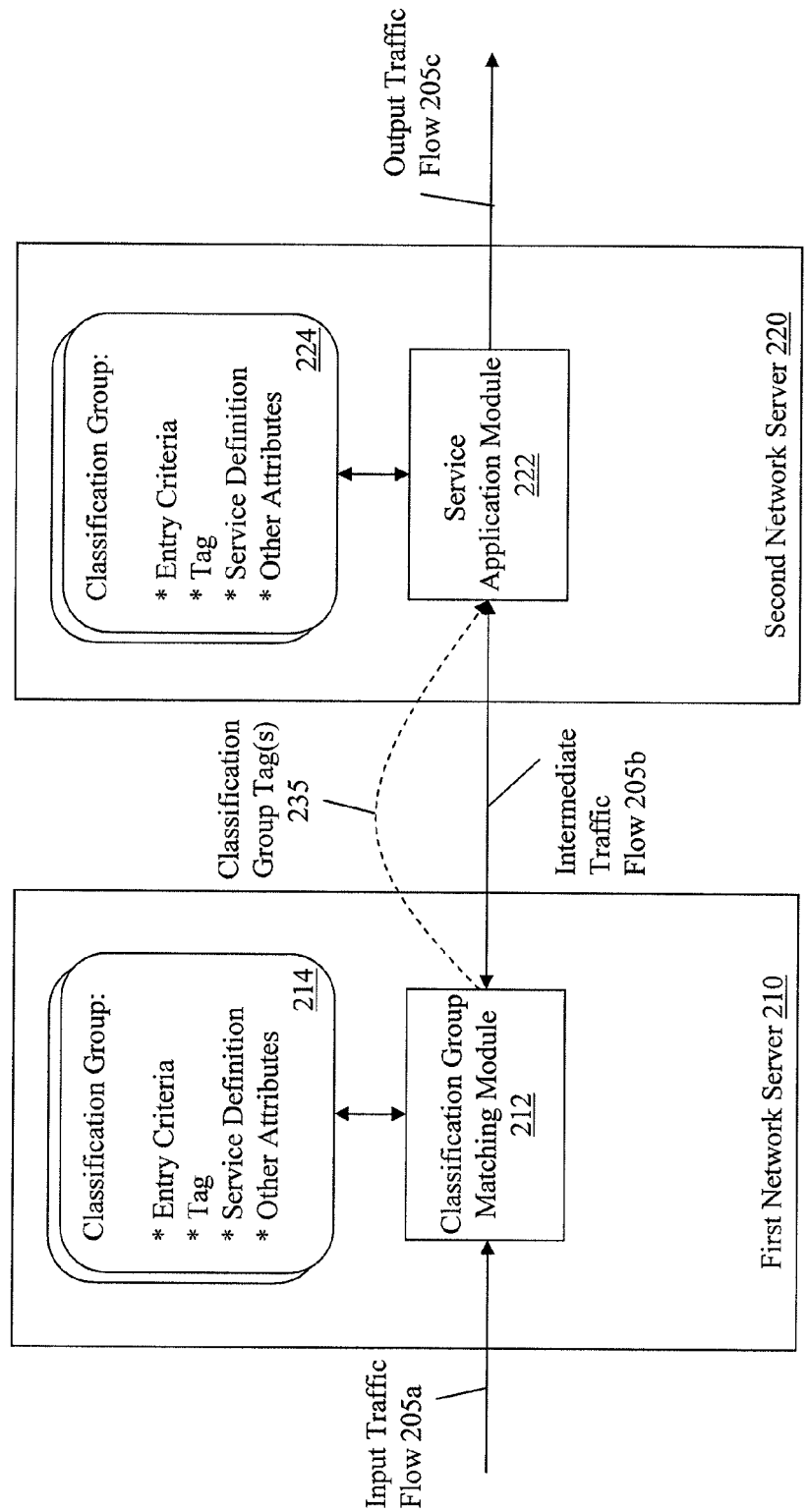
FIG. 2 is a block diagram of an exemplary system for dynamic classification and grouping of network traffic for service application across multiple nodes.

FIG. 2 is a block diagram of an exemplary system 200 for dynamic classification and grouping of network traffic for service application across multiple nodes. The system 200 includes an input traffic flow 205a, a first network server 210 which includes a classification group matching module 212 and one or more classification groups 214, a second network server 220 which includes a service definition application module 222 and one or more classification groups 224, an intermediate traffic flow 205b, and an output traffic flow 205c. The input traffic flow 205a, the intermediate traffic flow 205b, and the output traffic flow 205c can be combined to represent an overall traffic flow (collectively, 205) that traverses the network through the first network server 210 and the second network server 220.

In some embodiments, the first network server 210 and the second network server 220 can be any of the following: a session border controller, an application server, a switching node, or another type of device connected to a communications network. One of ordinary skill in the art will understand that the techniques described herein can be implemented on many different server types or computing devices without departing from the spirit or scope of the invention.

While the first network server 210 and the second network server 220 are represented in FIG. 2 as different physical devices, the first network server 210 and the second network server 220 can alternatively reside in a single physical device. The first network server 210 and the second network server 220 can communicate via a communications network, such as, for example, a local network (e.g., LAN) or a wide area network (e.g., Internet).

The first network server 210 receives an input traffic flow 205a. In some embodiments, the traffic flows originate at user equipment that are located on the same network as the network servers 210 and 220, or on different networks. A "subscriber" can be an individual user, a group of users, a business, a corporation, or an entity that can access the service provider's network. One of ordinary skill in the art will understand that the techniques described herein are not limited to application on network traffic initiated or provided by a particular configuration of subscribers or users.

In some embodiments, the traffic flow 205 can include a series of packets, which are units of data formatted for transmission over a communications network. A packet generally includes metadata and a payload. The packet metadata includes attributes related to the packet (e.g., arrival information, destination information, origin information, encoding protocols, or structure of information in the packet). The payload includes the user data to be transmitted.

One or more of the packets in the traffic flow 205 can include an event. In some embodiments, the event is associated with the signaling protocol (e.g., Session Initiation Protocol or "SIP") of the traffic flow. For example, the event can be an SIP REGISTER request or an SIP INVITE request. Events in the traffic flow 205 can be related to each other, for example, on the basis of their sequence in the traffic flow 205. In some embodiments, the event is associated with the media content (e.g., media type, encoding protocol, etc.) of the traffic flow 205. For example, the event can be based on a particular codec used by the subscriber's equipment or network.

Any of the attributes in the traffic flow 205 can be used by the first network server 210 and/or the second network server 220, for example, to classify the traffic flow into groups by comparing the attributes against entry criteria of the classification groups (e.g., 214/224), as explained in greater detail below.

The techniques described herein also utilize tags (e.g., Classification Group Tag(s) 235) which can be transferred via the traffic flow 205 between different nodes (e.g., first network server 210 and second network server 220) in the network. For example, the tag(s) 235 can be applied to the input traffic flow 205a at the first network server 210 and transferred between the first network server 210 and the second network server 220 via the intermediate traffic flow 205b. The tags can be applied to the traffic flow 205 using the intermodal signaling between the first network server 210 and the second network server 220. In some embodiments, the tags 235 are used to define a label to be exchanged between nodes. The meaning of the tag 235 is established through the provisioning actions of the operator of the nodes (e.g., first network server 210, second network server 220). Generally, a first node (e.g., first network server 210) in the network that receives the input traffic flow 205a identifies, via matching, which tags are applicable to an action or an event in the traffic flow 205. For example, the first network server 210 receives an input traffic flow 205a, and matches attributes of the input traffic flow 205a with entry criteria associated with a classification group 214 defined on the first network server 210. The first network server 210 then makes the classification group information available to the second network server 220 by transferring the tag(s) 235 via the intermediate traffic flow 205b. The second network server 220 can use the tags 235 to retrieve classification group 224 information located on the second network server 220 and perform other functions with respect to the traffic flow 205. For example, the second network server 220 can apply a service to the traffic flow 205 using the service definition application module 222. The service is based on the classification group 224 associated with the tag 235.

The tags 235 preserve the concept of classification group membership between different nodes in the network. The advantage of this technique is that the process of determining which level of service to apply to a given traffic flow can span multiple nodes, with execution of the associated service logic occurring at the node(s) where the execution is needed or desired.

In some embodiments, the tags 235 are provisioned by the network operator as part of the configuration of the first network server 210 and second network server 220. This technique provides the advantage of reducing or eliminating code changes to individual nodes, and eliminating the need for a standard to be approved by a standard developing organization (SDO). The operator can construct any number of tags 235, up to the limits of what each node can support. The definition of the tags 235 is also determined by the operator. The definition of the tag 235 determines the matching criteria used to determine if a traffic flow 205 should be associated with a specific tag 235 and in the resultant service logic executed when a node (e.g., second network server 220) recognizes the classification group assignment. Another advantage of this technique is that physical equipment (e.g., computing devices, servers, switches) utilized by the network can be produced by any number of different manufacturers, as long as the equipment can support this technique.

The tags 235 can be associated with classification groups 214/224 in a number of different ways. A preferred embodiment is to give a tag 235 a one-to-one relationship with a classification group 214/224 (e.g., the name of the classification group is used as the tag). In some embodiments, the classification groups 214/224 include a separate ID number, code, or text string, which is defined as part of the classification group profile. The ID number, code, or text string can be used as the tag 235. In other embodiments, a single tag 235 has a relationship with multiple classification groups 214/224.

As seen in FIG. 2, the tags 235 can be exchanged between the first network server 210 and the second network server 220 via the intermediate traffic flow 205b (e.g., as an extension of the internodal signaling). However, one skilled in the art will understand that there are a number of different ways in which the tags 235 can be exchanged (e.g., separate dedicated channel, in-band). In some embodiments, a tag is a plain text descriptor (e.g., "RECORD_CALL"), an enumerated type, an XML element, or any other form of identifier that can be transmitted over the communication path between nodes.

Figure 3:
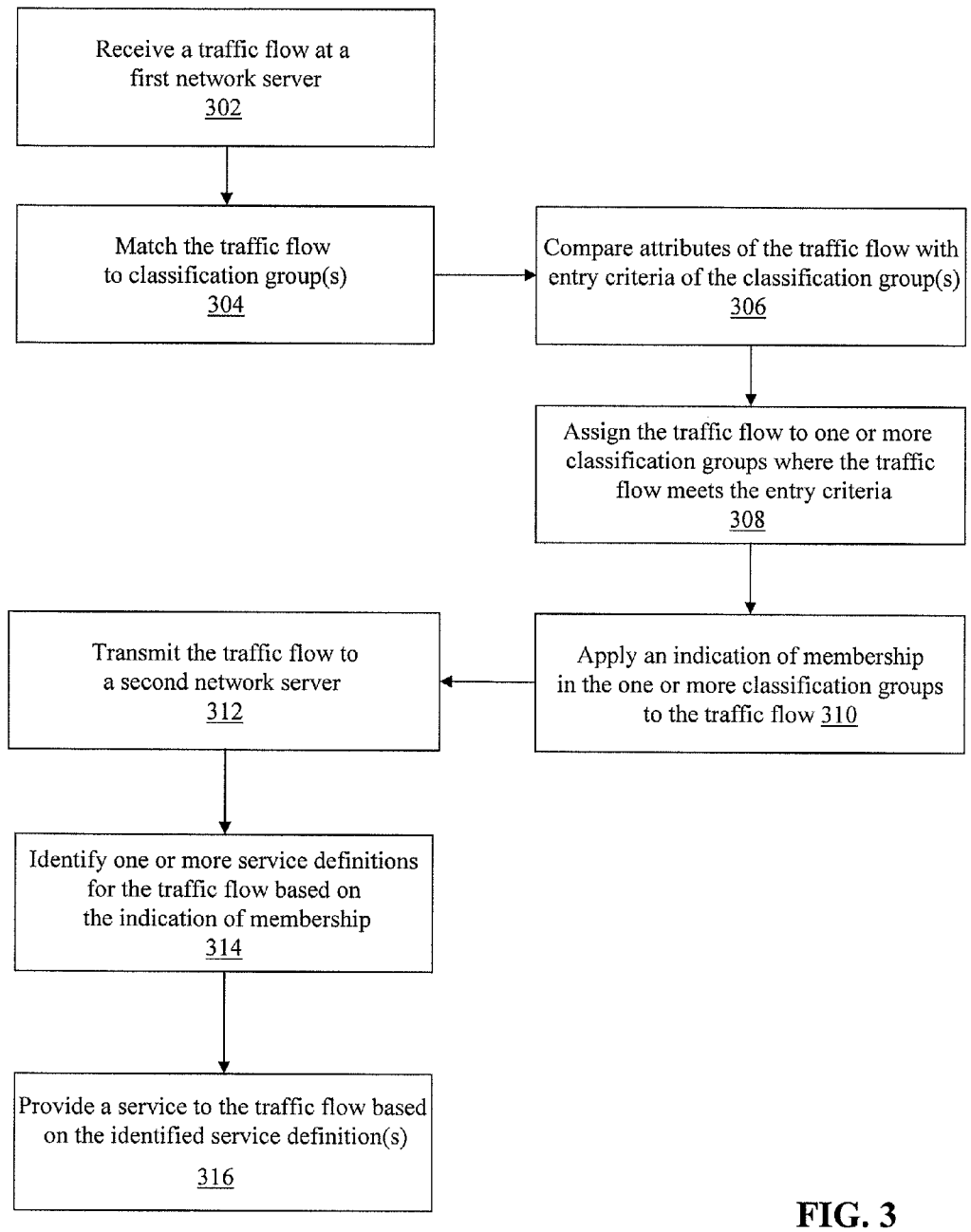
FIG. 3 is a flow diagram of an exemplary method for dynamic classification and grouping of network traffic for service application across multiple nodes.

FIG. 3 is a flow diagram of an exemplary method 300 for dynamic classification and grouping of network traffic for service application across multiple nodes. A first network server 210 receives (302) a traffic flow 205. For example, the first network server 210 can receive the traffic flow 205 from user equipment located on another network. Using the classification group matching module 212, the first network server 210 matches (304) the traffic flow 205 to one or more classification groups 214. In some embodiments, the classification groups 214 are stored on the first network server 210 (e.g., in a local database or memory module). In other embodiments, the classification groups 214 are retrieved from another location in the network.

In performing the matching step, the classification group match module 212 of the first network server 210 compares (306) attributes of the traffic flow 205 with entry criteria of the classification groups 214. The classification group match module 212 assigns (308) the traffic flow 205 to one or more classification groups 214 where the attribute(s) of the traffic flow 205 meet the entry criteria of those classification group(s) 214. The classification group match module 212 applies (310) an indication of membership (e.g., tag 214) in the one or more classification groups 214 to the traffic flow 205. The first network server 210 transmits (312) the traffic flow to the second network server 220. Using the service definition application module 222, the second network server 220 identifies (314) one or more service definitions for the traffic flow 205 from the classification groups 224 associated with on the indication of membership (e.g., tag 214). The service definition application module 222 provides (316) a service to the traffic flow based on the identified service definition(s).

In some embodiments, the classification group matching module 212 is a hardware or software module (e.g., implemented on a processor or other computing device) that matches the traffic flow 205 to one or more classification groups 214. The service definition application module 222 is a hardware or software module (e.g., implemented on a processor or other computing device) that applies service definition logic to the traffic flow 205 based on the classification groups 224 associated with the tag(s) provided via the internodal signaling 230.

In some embodiments, the operator of the network associated with the system 200 defines rules such that the signaling content can be manipulated. In some examples, such functionality is called Signaling Manipulation Functionality (SMF). SMF can be used as a generic term to include any such manipulation capability irrespective of a particular vendor's device. The techniques described herein utilize the SMF capability in part to solve the problems described above.

Generally, SMF can be implemented in a variety of different ways, as the operator of the communications network has the ability to specify multiple rules. In some examples, a rule includes two parts: a Match and an Action. A Match can define a pattern to look for in the attributes associated with a traffic flow, and an Action can define some action to take place, such as replacing a data element in the attributes of a traffic flow with a new value.

In some SMF implementations, there is not a strict 1:1 relationship between Match and Action. A Match condition may result in multiple Actions, or the implementation can require multiple Match conditions to be satisfied in order for an Action to be taken.

In some embodiments, the techniques described herein utilize the Match capabilities of SMF alongside a type of Action function that assigns the subscriber, traffic flow, or an event included in the traffic flow to a classification group (as opposed to the normal Action of a manipulation on some aspect of the signaling). In the example where a rule has multiple Action parts, the techniques described herein can invoke classification Actions and also traffic flow attribute manipulation Actions.

Extension of Matching Criteria to Multiple States

In some embodiments, the techniques described herein advantageously include a system capable of matching against multiple events. Instead of being limited to pattern match rule(s) against one message only, the system can include a finite state machine (FSM), which can include match criteria to be applied against multiple events in a traffic flow. Thus, in some embodiments, classification group membership is defined based on a sequence of events in a traffic flow. Furthermore, the sequence of events is matched based on the content and/or type of the events. For example, two classification groups can be defined with the following sets of rules:

| Group | Rules |
|---|---|
| Registering Users | Rule 1: Matches for reception of register |
|  | Rule 2: Matches for sending 401 unauthorized |
| Registered Users | Rule 1: Matches for reception of register |
|  | Rule 2: Matches for sending of 200 OK |

In these embodiments, the rules associated with a classification group are defined as an FSM. Subsequent rules are active or tested only if previous rules are matched.

In the example classification groups presented above, when the traffic flow attributes (e.g., signaling exchange) match the first group (e.g., "Registering Users"), it indicates one or more users attempting to register, but either the first network server 210 or a computing device further along the traffic flow path (e.g., second network server 220) is asking for credentials to ensure the user is authorized. When the classification group matching module 212 matches the traffic flow 205 attributes to the second classification group (e.g., "Registered Users"), it indicates that one or more users has completed registration. In this example, the treatment afforded to traffic flows (e.g., traffic flow 205) from the same source (e.g., subscriber network) is different based on the policies or service definitions associated with the first classification group ("Registering Users") versus the second classification group ("Registered Users"). For example, the system 200 can only allow a subscriber to initiate calls (e.g., SIP INVITE requests) when fully authenticated, as represented by belonging to the "Registered Users" classification group.

Media Matching

In some embodiments, the system 200 matches a traffic flow (e.g., traffic flow 205) by examining the type of media associated with the traffic flow 205. Some examples of this technique include deep packet inspection (DPI) or deep packet manipulation (DPM) technology to identify types of traffic based on matching patterns/rules about the contents of the packets. In these embodiments, the system 100 uses pattern matching capability of DPI or DPM to determine the type of media associated with the traffic flow 205, and then uses the media type as one of the entry criteria for the classification groups 214. For example, in addition to specifying rules pertaining to signaling content, the system 200 also supports DPI, DPM, or any other media classification technology for use in classification group matching.

Classification Groups and Service Definitions

In some embodiments, the classification groups (e.g., classification groups 214 and 224) are located on the first network server 210 and the second network server 220, respectively. In some embodiments, the attributes of a classification group are as follows:

Entry Criteria can define the matching conditions for an entity to be included in the classification group. In one embodiment, the entry criteria include an associated list of Match clauses from an SMF function. The entry criteria can include utilization of DPI pattern matching on the traffic flow 205. The entry criteria can include the combination of multiple rules based on an FSM spanning multiple events. For example, the first network server 210 of the system 200 can receive incoming events through the traffic flow 205 and test the events against the entry criteria (e.g., Match clauses) of the classification groups (e.g., 214). If the events meet the entry criteria, the system 200 assigns the events (and, in some embodiments, any subsequent associated event, such as those coupled by a binding or an FSM) to the classification groups (e.g., 214). The system 200 also applies a tag or tags to the traffic flow 205 based on the classification group 214 assignment for use by subsequent nodes (e.g., second network server).

Service Definition can define the type of service that the entities (typically subscribers) receive in common. In some embodiments, the service definition (e.g., as defined in classification group 224) is a label or name that is used by other modules of the system 200 to look up data in other tables or parts of the data model. The service definition can be a profile describing detailed attributes that define the common service. Examples include the following, although one skilled in the art will understand there are other ways the service definition can be defined:

a. Common bandwidth/call restrictions (e.g., the Call Admission Control (CAC) or leaky-bucket attributes);
b. Features that are permitted (e.g., Class-5 features in a VoIP access environment);
c. Transcoding capabilities that are offered;
d. Routing or server allocation (e.g., which registrar to direct network traffic).

In some embodiments, additional attributes can be defined as part of the classification groups 214/224. Examples include the following, although one skilled in the art will understand there are other attributes that can be included in the classification group 214/224:

1) Additional classification group relationships:
   a. A list of one or more additional classification groups that the entity automatically belongs to by virtue of its membership in the initial classification group;
   b. A list of one or more classification groups that the entity is automatically removed from by virtue of its membership in the initial classification group.

For example, membership in the initial classification group can have priority to override the entity's membership in other classification groups, or membership in the initial classification group can be mutually exclusive to membership in other classification groups. Any of the classification groups can include instructions that operate to determine an entity's membership in other classification groups (e.g., automatically include the entity in other groups, automatically exclude or remove the entity from other groups, etc.).

2) Maximum number of entries: this attribute defines the maximum number of entities (e.g., subscribers) that can be members of the classification group. For example, service (or specific classification(s) of service) can be refused to entities that attempt to join the classification group after the maximum number of entries has been met.

3) Time-of-Day/Day-of-Week etc.—this attribute defines the period(s) when the classification group is valid and available to apply the associated service. For example, the service associated with the classification group would not be available outside of the period(s) of time denoted in this attribute.

In some embodiments, the order of the classification group matches for the classification group relationships attribute is important because some degree of brokering or ordering logic is required to reconcile the group relationships into a merged set or sets. Also, in some embodiments, reconciliation of the group relationships requires suitable validation logic to catch illegal or redundant group combinations or to warn the system 200 about combinations having unintended service consequences.

In some embodiments, the service definition attributes are embedded directly in the classification group (e.g., classification groups 214/224 in FIG. 2). In other embodiments, the service definition attributes are distinct from the classification group. Logically, there can be two types of attributes: those that define the scope of membership in the classification group (e.g., entry criteria) and those that define the service to be delivered to members of the classification group (e.g., service definitions).

Relationship Between Classification Groups and Other Aspects of the Data Model

In some embodiments, Signaling/Media Matching, Classification Groups, and Service Definitions can provide a complete data model for the application. However, in other embodiments, these techniques do not replace existing data models in a switching node (e.g., first network server 210). In these embodiments, these concepts present an overlay or additional layer of control because some data models include an element of hierarchy based on the IP address space or application address space associated with the various elements and networks with which this node communicates (e.g., its peers). These hierarchies remain valid for some embodiments, and can be augmented with the additional techniques described herein to solve, for example, administration problems and provide additional flexibility.

Membership to Multiple Classification Groups

In some embodiments, classification groups are independent to each other and also to other elements in the data model. As a result, there is no conflict with an entity belonging to multiple classification groups at the same time. The classification group matching module 212 tests an event for membership in the classification groups 224 and, if the events or subscribers meet the entry criteria for more than one classification group, the matching module 212 assigns the events or subscribers to those classification groups.

In some embodiments, an entity receives the service (or restrictions) appropriate to multiple service definitions. These embodiments necessitate a kind of service broker arrangement which ensures that interactions, prioritizations, and overrides between separate service definitions are reconciled. Some embodiments avoid this reconciliation process by limiting membership of an entity or traffic flow to only one classification group. In these embodiments, the ordering of the classification groups 224, and evaluation of membership by the classification group matching module 212 is important. For example, the classification group matching module 212 may utilize a particular algorithm for assigning entities or events to a classification group (e.g., the first classification group match or the last classification group match, among others).

Event Association

In some embodiments, some events in the traffic flow 205 received by the first network server 210 are independent of other events, while some events have a particular relationship with other events. This relationship can be complex. Generally, the first network server 210 tracks events and their relationships using, for example, a finite state machine (FSM). Examples of finite state machines used by the first network server 210 include a call FSM or a registration FSM.

In some embodiments, the classification group matching module 212 of the first network server 210 tests events received in the traffic flow 205 to determine which (if any) classification groups 214 the events should be assigned, each time the event occurs or is received. In some embodiments, the classification group matching module 212 tests an initial event received from the traffic flow 205 and creates a binding to the event. The binding exists for a particular duration, and the classification group matching module 212 automatically assigns subsequent events associated with the binding to one or more classification groups 214 (e.g., those previously associated with the initial event).

The techniques described herein identify at least the following three ways in which events are associated with classification groups 214:

1) No Binding—the classification group matching module 212 tests each event independently as it arrives at the first network server 210. The event either matches one or more classification groups 214 or does not match any classification groups 214.

2) Classification Group Owns the Binding—the classification groups 214 are extended to include a data structure (e.g., array, list, table, hash) identifying the events or subscribers that the classification group matching module 212 has matched to the classification groups 214.

3) Some Other Entity Owns the Binding—a logical entity associated with the events or subscribers owns the binding. For example, an FSM associated with call or registration events includes data associated with the events. The data includes one or more classification groups 214 that the classification group matching module 212 has assigned to the events.

The difference between Classification Group Owns the Binding and Some Other Entity Owns the Binding is how the keying/lookup works. When the classification group 214 owns the binding, the classification group 214 is the primary object and includes references to stateful objects tracking the traffic flow 205 (e.g., call/registration FSMs). Alternatively, when some other entity owns the binding, an existing structure (e.g., call/registration FSMs) is the primary object and the structure tracks the one or more classification groups to which the events are assigned.

Figure 4:
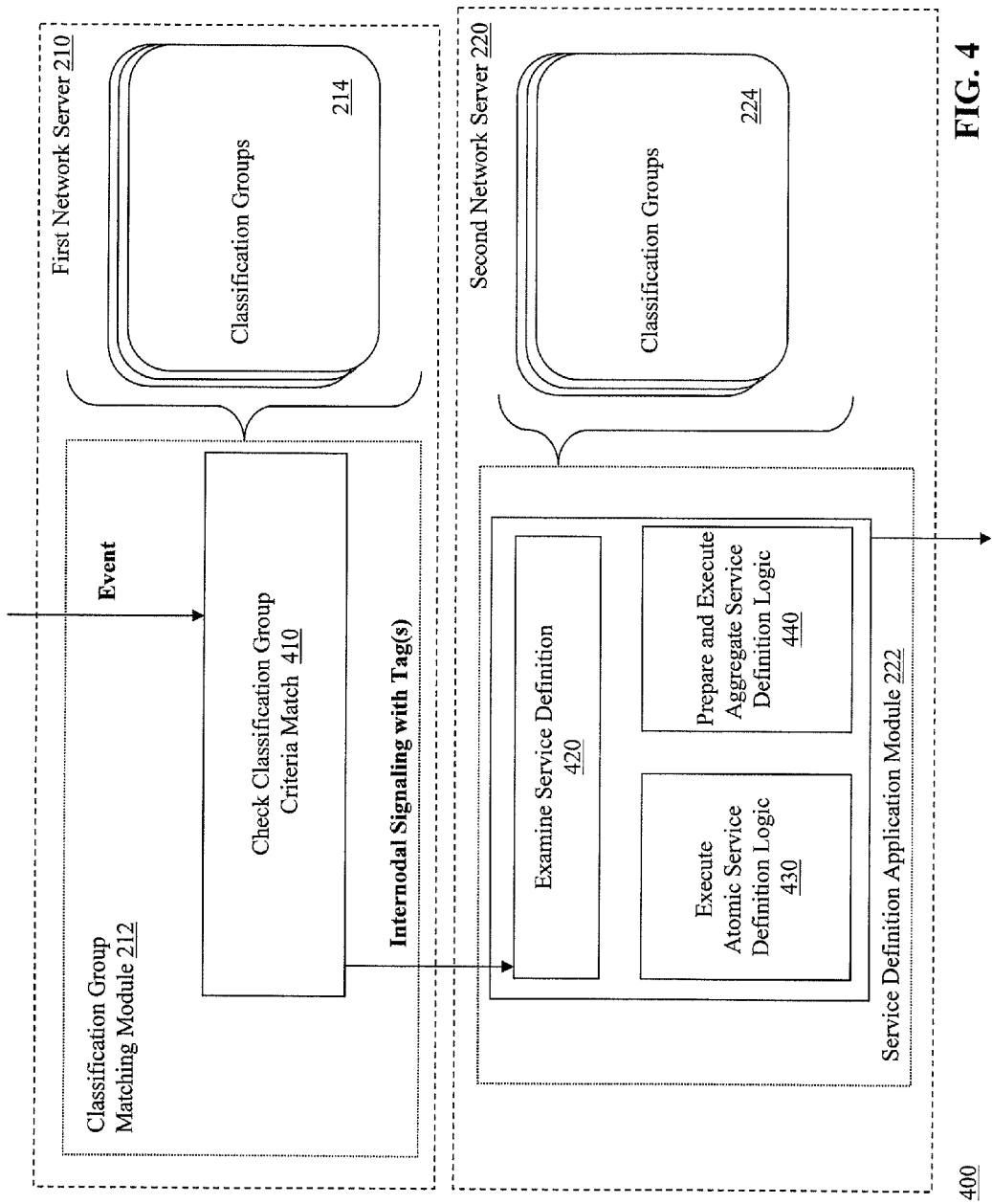
FIG. 4 is a block diagram of an exemplary method for dynamic classification and grouping of network traffic for service application across multiple nodes, with no permanent binding of events to classification groups.

FIG. 4 is a block diagram 400 of an exemplary method for dynamic classification and grouping of network traffic for service application across multiple nodes, with no permanent binding of events to classification groups.

In FIG. 4, the classification group matching module 212 at the first network server 210 receives an event. The matching module 212 invokes a check classification group criteria match procedure 410. This procedure 410 compares the entry criteria of the classification groups 214 with attributes from the event and determines the classification groups 214 to which the event matches. Based on the matches, the classification group matching module 212 assigns the event to the matched classification group(s) 214. The classification group matching module also applies an indication of membership (e.g., the tags associated with the assigned classification groups 214) to the event. The first network server 210 transmits the traffic flow including the event to the second network server 220, where the flow is received at the service definition application module 222. In some embodiments, the tags are transmitted to the second network server 220 via the internodal signaling.

The service definition application module 222 examines (420) the service definitions associated with the matched classification groups by locating the classification groups 224 that have the tags received from the first network server 210. The application module 222 executes (430) any atomic service definition logic (e.g., service definitions from classification groups 224 that are not related to or dependent on other classification groups). The application module 222 prepares (440) aggregate service definition logic based on the service definitions of the matched classification groups 224 if the matched classification groups 224 relate to or depend on each other. As part of the preparation of the aggregate service definition logic, the application module 222 reconciles the service definitions, for example, to remove conflicts or redundancies, and manage prioritization of the groups. An event may match one, many, or no classifications groups 224.

Once the service definition application module 222 has prepared the aggregate service definition logic, the application module 222 executes (440) the aggregate logic. For example, an event can match multiple classification groups (e.g., groups X, Y, Z), where X is "UE of a particular type", Y is "calling ID belongs to this number range", and Z is "belongs to this enterprise group." The operator of the first network server 210 may have applied a traffic policer to each of these classification groups (as they only want to permit certain traffic levels from this particular type of UE, or from a particular number range, or from a particular enterprise). In this example, the event matches all three classification groups. Therefore, it is undesirable for the event to pass through the traffic policer associated with the X and Y classification groups, but not pass through the traffic policer associated with the Z classification group without undoing charges associated with the X and Y policers. As a result, the application module 222 defers service definition logic for the X, Y, and Z classification groups until all classification groups have been matched. Then, the service definition logic is applied in aggregate.

Figure 5:
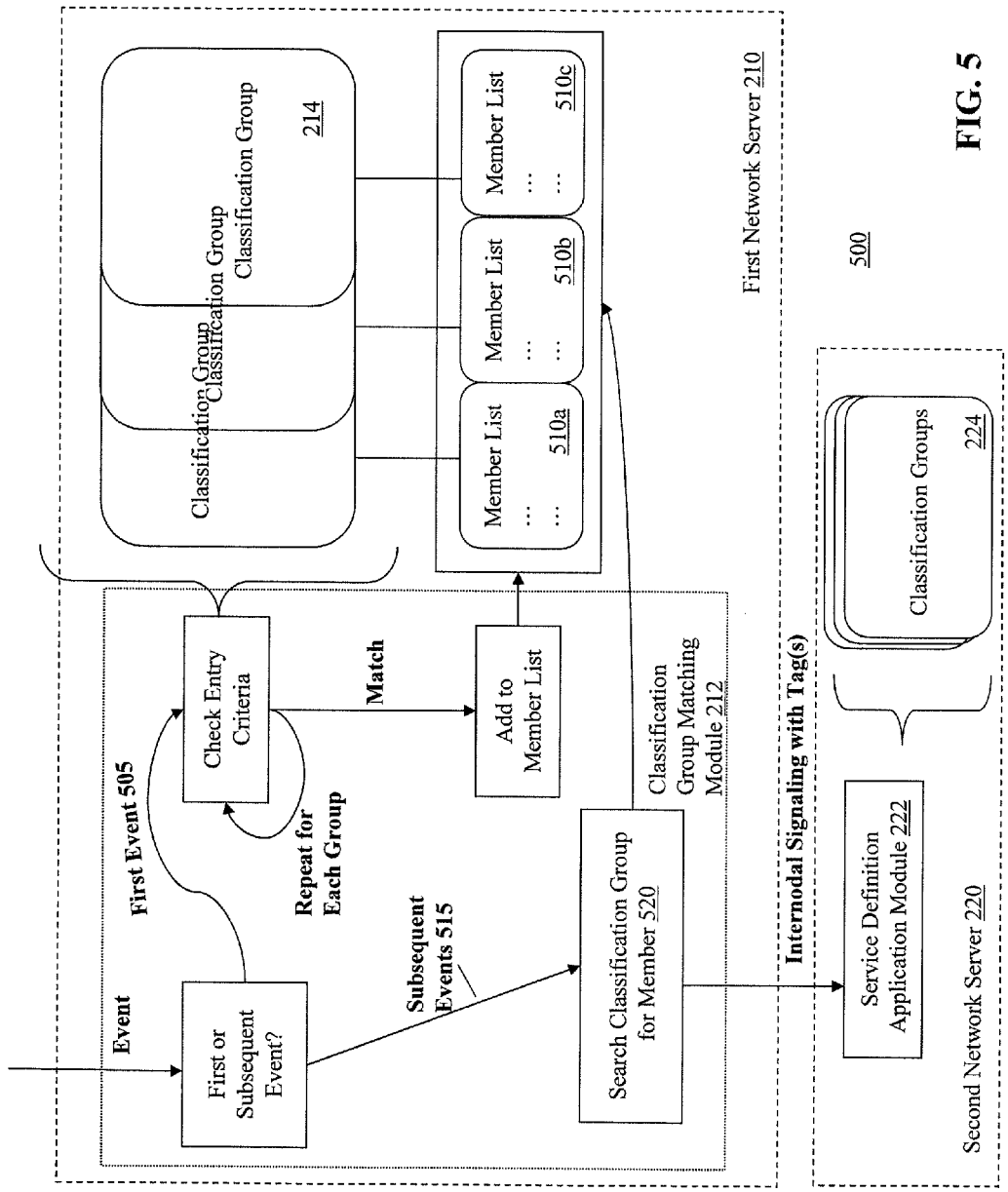
FIG. 5 is a flow diagram of an exemplary method for dynamic classification and grouping of network traffic for service application across multiple nodes, where the events are bound to the classification group.

FIG. 5 is a block diagram 500 of an exemplary method for dynamic classification and grouping of network traffic for service application across multiple nodes, where the events are bound to the classification group.

In this embodiment, an event received by the first network server 210 represents the first in a set of related events (e.g., the first event in a call, or an event that registers a subscriber to obtain service). As it is desirable to remember the classification group membership as each event of the set of related events is received, the classification groups 214 each maintain a list of members (e.g., member lists 510*a-c*). A set of events (as defined by an initial event and subsequent related events) is referred to as a "member" in this embodiment. Members can be identified by some appropriate datum (e.g., calling line identity (CLI), address of record (AOR)). A member can belong to zero, one, or multiple classification groups 214. Upon identification of a new member (i.e., receipt of a first event in a new event sequence), the classification group matching module 212 compares attributes of the member with the entry criteria of the classification groups 214 to determine whether to assign the member to the classification groups.

The classification group matching module 212 passes all subsequent events 515 to the "search classification group for member" function 520. This function 520 analyzes the member lists 510*a-c* to determine whether the events are associated with a member that has already been assigned to classification groups 214. As a result, the matching module 212 assigns the events to zero, one, or multiple classification groups 214. The matching module 212 also retrieves the tags associated with the matched classification groups and applies the tags to the events.

The first network server 210 transmits the events and tags to the second network server 220, where the events and tags are received by the service definition application module 222. The service definition application module 222 examines the service definitions associated with the matched classification groups by locating the classification groups 224 that have the tags received from the first network server 210, executes atomic service definition logic, prepares aggregate service definition logic, and processes the aggregate service definition logic.

The embodiment depicted in FIG. 5 can be used if the network server 210 does not include other functionality or structures to track bindings between members and classification groups. However, some network servers include functionality to track bindings in an efficient manner.

Figure 6:
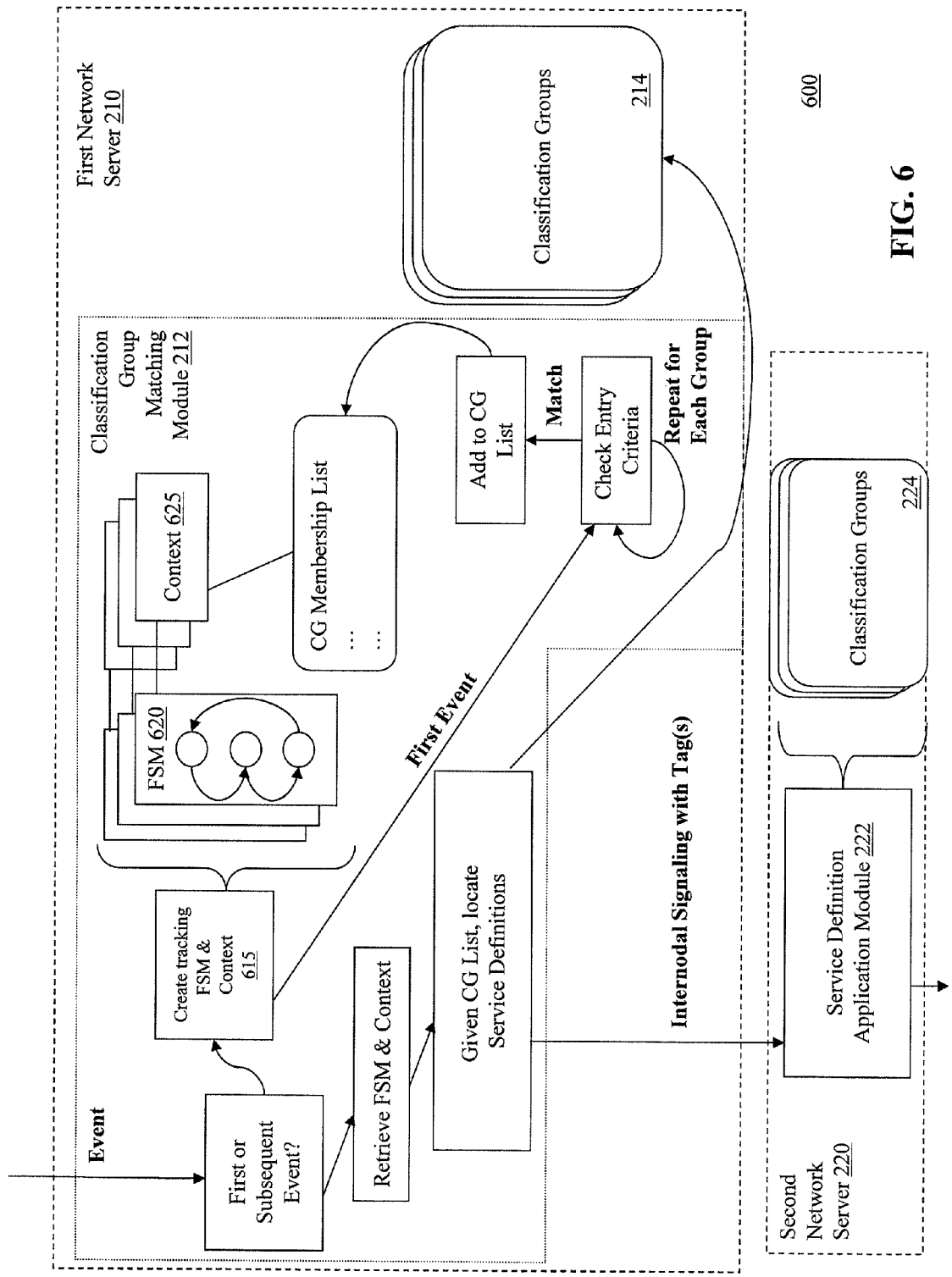
FIG. 6 is a flow diagram of an exemplary method for dynamic classification and grouping of network traffic for service application across multiple nodes, where the events are bound to a finite state machine which includes the classification group.

FIG. 6 is a block diagram 600 of an exemplary method for dynamic classification and grouping of network traffic for service application across multiple nodes, where the events are bound to a finite state machine (FSM) which includes the classification group.

In this embodiment, the first network server 210 receives the initial event in a sequence of events (e.g., a SIP REGISTER event). The classification group matching module 212 creates (615) a context control block including an FSM 620 and Context 625 to track that sequence of events. Once the FSM 620 and Context 625 are created, the classification group matching module 212 compares the first event with entry criteria of the classification groups 214. If the classification group matching module 212 assigns the sequence of events to one or more classification groups 214, indicia (e.g., tags) identifying the classification groups 214 are stored in the Context 625 bound to the FSM 620. The stored indicia allow the classification group matching module 212 to match subsequent events in the sequence to the FSM 620 and Context 625 and efficiently determine the classification groups 214 to which the subsequent events are assigned, and then apply the tags as needed to the subsequent events for further processing by the second network server 220.

In some embodiments, the classification group matching module 212 modifies the group membership based on matching subsequent events to entry criteria of one or more additional classification groups. As a result, the classification group matching module 212 can assign the subsequent events to additional classification groups or exclude the subsequent events from classification groups previously assigned to the first event. Accordingly, the matching module 212 can apply tags to or remove tags from the traffic flow based on the modifications. Thus, the FSM 620 and Context 625 can act dynamically to alter the existing classification group membership of the sequence of events (or the entire traffic flow) based on receipt and evaluation of subsequent events.

Changes to Group Membership

As set forth above, the system 200 assigns one or more classification groups to events and/or subscribers (e.g., based on a SIP REGISTER event). The system 200 can bind and track assigned classification groups with the events, resulting in the application of service definition logic that exists for the duration of the sequence of events. The system 200 can associate the classification groups and service definition logic with subsequent events (e.g., additional calls) related to the same REGISTER event without requiring further evaluation of classification groups.

A further aspect of the techniques described herein is the ability to have classification group membership change (e.g., as subsequent events are received by the system 200). In some embodiments, the techniques provide for re-evaluation of classification group membership for each subsequent event received by the system 200. The system 200 can verify that the current classification group memberships are still valid for a particular sequence of events or a particular subscriber. The system 200 can also verify that additional classification groups are eligible to be assigned to the sequence of events, or that some or all of the currently-assigned classification groups should no longer be assigned to the sequence of events:

1) The first network server 210 receives an initial REGISTER event from a subscriber. The first network server 210 assigns the event to a classification group for "standard users," and applies a tag "X" to the traffic flow. The first network server 210 transmits the traffic flow with the tag to the second network server 220. The second network server 220 applies service definition logic associated with that classification group to the traffic flow, based on the received tag.

2) For subsequent calls (e.g., INVITE events), the first network server 210 conducts another matching process against the classification groups, for example, if the first network server 210 has determined that the subscriber uses a particular codec (e.g., a high rate codec such as AMR-WB). As a result of the matching process, the first network server 210 assigns the events or the subscriber to a classification group for "premium users," and applies a tag "Y" to the traffic flow and removes the tag "X." The first network server 210 transmits the traffic flow with the new tag to the second network server 220. The second network server 220 applies service definition logic associated with that classification group to the traffic flow, based on the received tag.

In some embodiments, changes to the classification group(s) for a sequence of events or a subscriber alters the manner in which the subscriber is billed, the manner in which the minutes expended on the call are accounted, or the way that bandwidth is reserved/allotted. The classification group change can exist as long as the subscriber is registered with the first network server 210, or can only apply as a one-time override to that specific INVITE event.

The techniques described herein provide for at least the following forms of classification group membership change:

1) Classification Groups are Purely Additive—once the system 200 has assigned an event or sequence of events to a classification group or groups, the event(s) remain a member of the classification group for as long as the event(s) are tracked. In this embodiment, the system 200 assigns more classification groups and applies additional tags as they match the event(s) over time.

2) All Classification Groups are Re-evaluated for Each Event and Only the New Matches Count—this embodiment is illustrated in FIG. 4. The system 200 discards previously-matched classification groups and conducts the matching process for events as they are received by the first network server 210.

3) All Classification Groups are Re-evaluated for Each Event and Existing Matches Remain—in this embodiment, the system 200 retains existing classification group matches and keeps the application of tags even when additional events are received by the first network server 210. The system 200 assigns additional classification groups and applies additional tags as events are matched to these groups. Previously-existing applications of tags continue unless the system 200 explicitly removes the tags via an instruction associated with a new classification group match. In this embodiment, a classification group optionally includes attributes pertaining to additional classification group relationships. For example, membership of an event in one classification group can impact an event's membership in other classification groups.

Example Use Case 1

Figure 7:
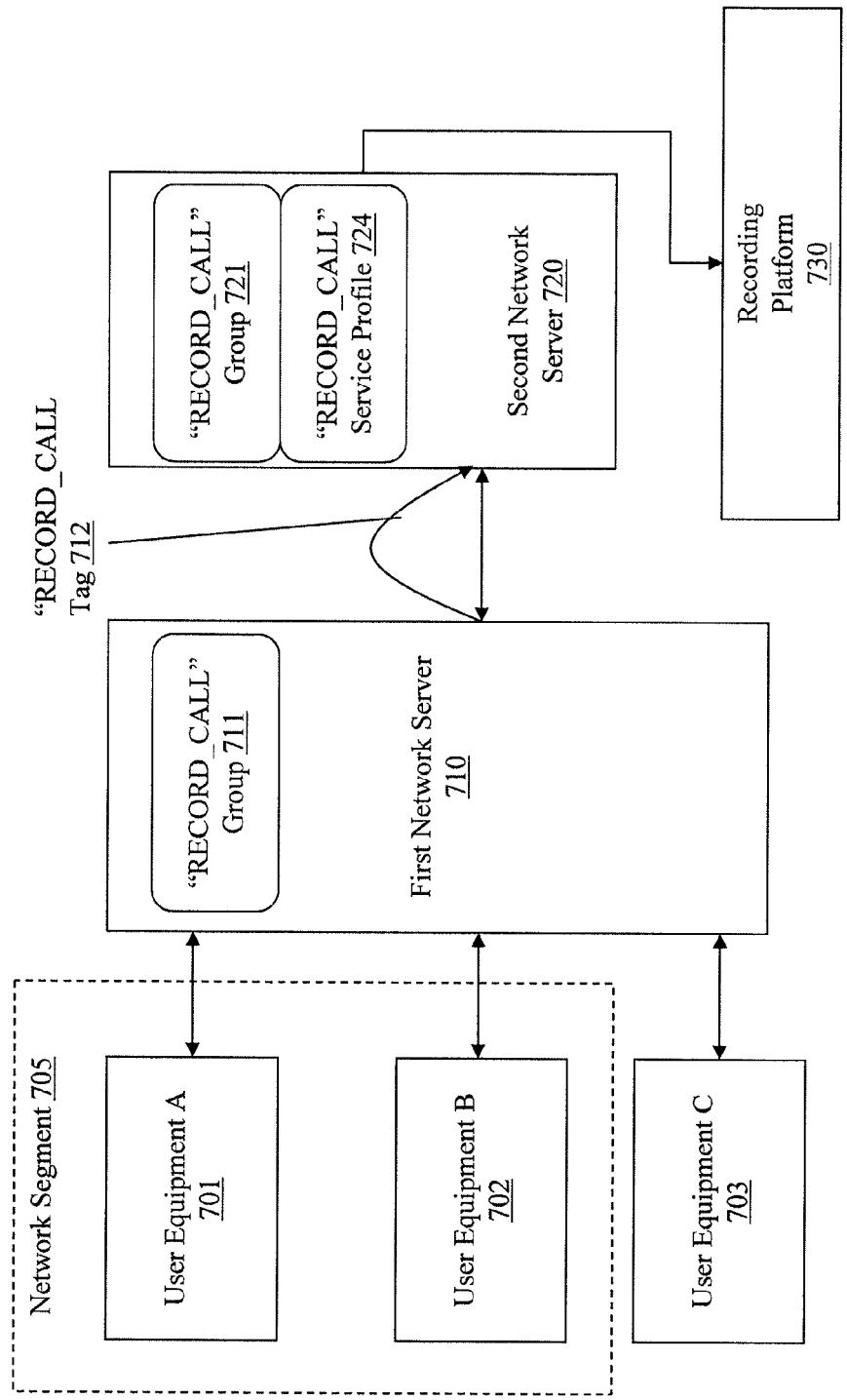
FIG. 7 is a block diagram of an exemplary system for dynamic classification and grouping of network traffic for service application across multiple nodes.

FIG. 7 is a block diagram of an exemplary system 700 for dynamic classification and grouping of network traffic for service application across multiple nodes. In the following example, a service provider or other operator of a network wishes to record calls originating at a specific access network segment. In this example, UE A 701 or UE B 702 belongs to the access network segment 705 that the operator wishes to record. Therefore, traffic flows originating from UE A 701 or UE B 702 match the entry criteria to belong to a "RECORD_CALL" classification group 711 defined at the first network server 710 (e.g., a session border controller). The classification group 711 is configured to include the "RECORD_CALL" tag 712 in the internodal signaling from the first network server 710 to the second network server 720 (e.g., an application server). Traffic flows that originate from UE A 701 or UE B 702 have the "RECORD_CALL" tag 712 added as the traffic flow progresses to the second network server 720.

The second network server 720 is also configured to have a "RECORD_CALL" classification group 721. In this example, the "RECORD_CALL" classification group 721 has no entry criteria. Instead, the "RECORD_CALL" classification group 721 includes a default rule that if a traffic flow received from the first network server 710 has already been tagged, the second network server 720 assigns the traffic flow to the classification group (e.g., classification group 721) associated with the applied tag (e.g., "RECORD_CALL" tag 712). Therefore, traffic flows originating at UE A 701 or UE B 702 gain automatic membership to the "RECORD_CALL" classification group 721 at the second network server 720 by virtue of the tag 712 applied to the traffic flow at the first network server 710. The second network server 720 retrieves a service profile associated with the "RECORD_CALL" classification group 721 located on the server 720. The retrieved service profile 724 specifies that the second network server 720 should direct calls to another node in the network (e.g., recording platform 730) to accomplish the recording of the call.

Traffic flows from UE C 703 do not match the entry criteria for the "RECORD_CALL" classification group 711 at the first network server 710 because UE C 703 is not located in the same access network segment as UE A 701 and UE B 702. Therefore, the first network server 710 does not assign the traffic flows from UE C 703 to the "RECORD_CALL" classification group 711 and does not apply the "RECORD_CALL" tag 712 to the traffic flows. Accordingly, the second network server 720 does not assign the traffic flows from UE C 703 to the "RECORD_CALL" classification group 721 located at the server 720, and the traffic flows are not directed to the recording platform 730.

Example Use Case 2

Referring back to FIG. 2, in this use case, the first network server 210 and the second network server 220 have classification group "X" (e.g., 214 and 224) defined at each server, respectively. The first network server 310 matches a traffic flow (e.g., 205), assigns membership to classification group "X" (e.g., 214), and applies a tag 235 associated with group "X" 214 to the traffic flow. The second network server 220 receives the traffic flow and compares the attributes of the traffic flow against the entry criteria of classification group "X" 224 located at the second server 220. In some embodiments, classification group "X" 224 on the second network server 220 can also have independent criteria, depending on how the operator configures the groups. For example:

a. Receiving Tag X 235 from the first network server 210 can override the entry criteria associated with classification group X 224 and the traffic flow is automatically assigned to the group 224. In this example, the second network server 220 uses the entry criteria of group 224 to check traffic flows received without Tag X 235, either from the first network server 210 or from some other node in the network.

b. Receiving Tag X 235 from the first network server 810 can be one of the entry criteria for classification group 224, and the traffic flow still needs to match the other entry criteria for the group 224. Thus, in order for the traffic flow to be assigned to classification group 224, the first network server 210 must have already verified the traffic flow 205 is a candidate for belonging to group 224 (e.g., by virtue of assigning the traffic flow to group 214), and then the second network server 220 confirms the assignment to group 224 via the additional entry criteria.

Example Use Case 3

Continuing with FIG. 2, in this use case, the first network server 210 has defined classification group X 214, but the second network server 220 has not defined classification group. In this example, the second network server 220 ignores the tag 235 applied to the traffic flow 205 at the first network server 210, and the second network server 220 applies default service logic to the traffic flow.

Example Use Case 4

Continuing with FIG. 2, in this use case, the first network server 210 and the second network server 220 have configured classification group "X" 214/224, respectively. When the first network server 210 receives an event of a traffic flow 205 (e.g., an INVITE for a call), the first network server 210 compares the entry criteria of the group 214 with the attributes of the traffic flow 205, but the first network server 210 is unable to determine a match. When the first network server 210 transmits the traffic flow to the second network server 220, the second server 220 has access to different information associated with the traffic flow 205, and determines that the traffic flow matches the entry criteria of classification group X 224 on server 220.

In some embodiments, the second network server 220 can communicate this result in a response message to the first network server 210. The first server 210 the updates the classification group memberships 214 located at the first server 210, based on the tag, received from the second server 220, for the traffic flow 205.

In addition, the exclusion or inclusion rules associated with the classification groups can be applied differently at the two network servers 210 and 220. For example, the first network server 210 assigns a traffic flow 205 to a classification group 214, applies a tag 235 to the traffic flow, and transmits the traffic flow and the tag to the second network server 220. Upon receiving the traffic flow and the tag, the second network server 220 can assign the traffic flow to another classification group 224 that may have different exclusion or inclusion rules. The second network server 220 can then execute the different rules to modify the set of classification groups to which the traffic flow belongs.

Example Use Case 5

Figure 8:
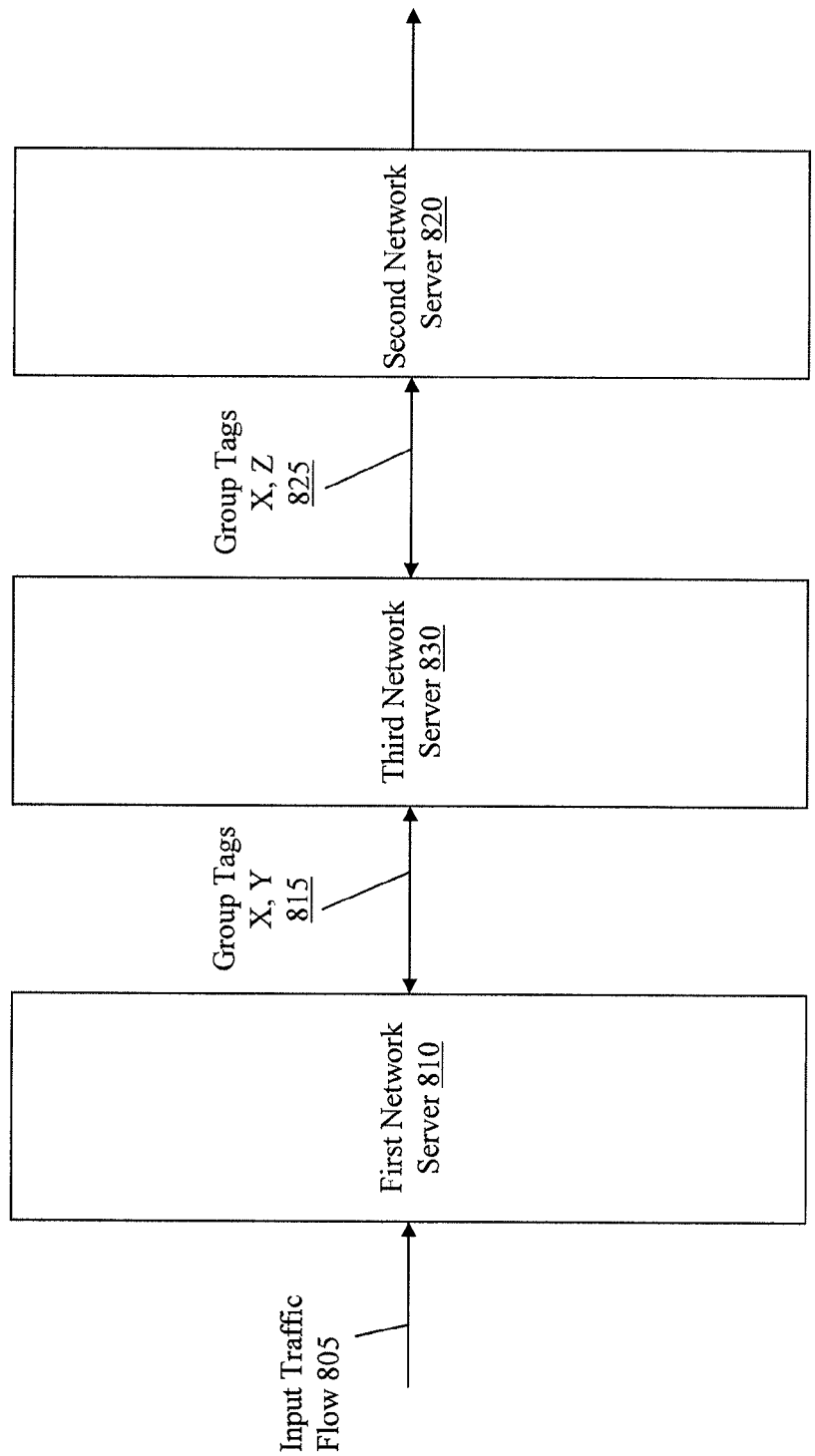
FIG. 8 is a block diagram of an exemplary system for dynamic classification and grouping of network traffic for service application across multiple nodes.

FIG. 8 is a block diagram of an exemplary system 800 for dynamic classification and grouping of network traffic for service application across multiple nodes. In this example, the system 800 includes a third network server 830 (e.g., a relay server) interposed between the first network server 810 and the second network server 820. This structure can be extended to include any number of nodes communicating flows back and forth.

The third network server 830 has access to different information associated with the traffic flow 805 than the first network server 810. In some embodiments, the third network server 830 is a SIP Redirect/Proxy (e.g., PSX), which has a rich routing database and performs a different analysis of the traffic flow. Thus, the third server 830 improves the classification group information and tags (e.g., 815) transmitted to the second network server 820.

The third server 830 modifies the classification group membership that the first server 810 has assigned to the traffic flow, and changes the tags applied to the traffic flow. In one example, application of the group tags "X,Y" 815 represents a preliminary classification group assignment of the traffic flow. In this example, the third server 830 can refine the application of group tags "X,Y" 815 based on the additional information it has about the traffic flow, thereby replacing tag "Y" in the group tags "X, Y" 815 with tag "Z" in the group tags "X, Z" 825.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VoIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method for applying service based on classification and grouping of traffic flows in a communication path between a first device and a second device said communication path including a first network server and a second network server, the method comprising:
   receiving, at a first network server, a traffic flow containing packets from the first device;
   matching, at the first network server, the traffic flow to classification groups, wherein the matching comprises:
      comparing attributes of the traffic flow with entry criteria of the classification groups;
      assigning the traffic flow to one or more classification groups where the attributes of the traffic flow meet the entry criteria of the one or more classification groups;
      applying an indication of membership in the one or more classification groups to the traffic flow;
   transmitting, by the first network server, the traffic flow to a second network server, wherein the traffic flow includes the indication of membership;
   identifying, at the second network server, one or more service definitions for the traffic flow based on the indication of membership applied to the traffic flow by the first network server;
   providing, at the second network server, a service to the traffic flow based on the one or more identified service definitions; and
   transmitting, by the second network server, the traffic flow to the second device.

2. The method of claim 1, wherein the indication of membership includes a list of indicia associated with the one or more classification groups assigned to the traffic flow.

3. The method of claim 2, wherein the list of indicia is in at least one of: an XML body, a plain text body, native SIP headers, or native SIP fields.

4. The method of claim 2, wherein the list of indicia is in an XML body.

5. The method of claim 1, further comprising:
   reconciling, at the second network server, the identified service definitions for the traffic flow.

6. The method of claim 5, wherein reconciling the identified service definitions for the traffic flow comprises:
   configuring logic of the identified service definitions for the traffic flow to manage interactions between the identified service definitions for the traffic flow.

7. The method of claim 1, wherein providing a service to the traffic flow comprises:
   executing logic associated with the service definitions identified for the traffic flow.

8. The method of claim 1, further comprising:
   automatically assigning, at the second network server, the traffic flow to one or more additional classification groups based on the indication of membership.

9. The method of claim 8, wherein automatically assigning the traffic flow to one or more additional classification groups is based on instructions in the one or more classification groups associated with the indication of membership.

10. The method of claim 1, further comprising:
    automatically excluding, at the second network server, the traffic flow from one or more additional classification groups based on the indication of membership.

11. The method of claim 10, wherein automatically excluding the first event from one or more additional classification groups is based on instructions in the one or more classification groups associated with the indication of membership.

12. The method of claim 1, further comprising:
    comparing, at the second network server, attributes of the traffic flow with entry criteria of one or more additional classification groups;
    assigning, at the second network server, the traffic flow to the one or more additional classification groups where the attributes of the traffic flow meet the entry criteria of the one or more additional classification groups; and
    modifying, at the second network server, the indication of membership based on assigning the traffic flow to the one or more additional classification groups.

13. The method of claim 1, wherein the first network server and the second network server each include a user interface, the user interface receiving configuration instructions for the classification groups.

14. The method of claim 1, wherein the traffic flow includes a first event and wherein the first event is assigned to said one or more classification groups as part of assigning the traffic flow to one or more classification groups.

15. The method of claim 14, wherein the first event is the start of a sequence of events, the matching further comprising:
    analyzing a second event associated with the traffic flow to determine whether the second event is related to the first event; and
    assigning the second event to the one or more classification groups assigned to the first event.

16. The method of claim 1, wherein the classification groups are independent of the service definitions.

17. The method of claim 15, further comprising:
    comparing attributes of the second event with entry criteria of one or more additional classification groups; and
    assigning the second event to the one or more additional classification groups where the second event meets the entry criteria of the one or more additional classification groups.

18. The method of claim 17, wherein, for processing of the second event, the one or more additional classification groups override the classification groups previously assigned to the second event.

19. The method of claim 17, further comprising:
    excluding the second event from one or more of the classification groups assigned to the first event based on assignment of the second event to the one or more additional classification groups.

20. The method of claim 14, wherein the first event is the start of a sequence of events, the matching further comprising:
    binding the sequence of events to the one or more classification groups assigned to the first event; and
    assigning subsequent events in the sequence of events to the one or more classification groups assigned to the first event.

21. The method of claim 20, wherein binding the sequence of events to the one or more classification groups further comprises:

generating a data structure in each classification group of the one or more classification groups, wherein the data structure includes a reference to the sequence of events.

22. The method of claim 14, wherein the first event is the start of a sequence of events, the matching further comprising:
  instantiating a context control block upon determining the first event;
  storing indicia associated with the classification groups assigned to the first event in the context control block;
  analyzing, based on the stored indicia, subsequent events in the sequence of events associated with the traffic flow to determine whether the subsequent events are related to the first event;
  assigning the subsequent events to the one or more classification groups assigned to the first event and stored in the context control block; and
  applying an indication of membership in the one or more classification groups to the subsequent events.

23. The method of claim 22, further comprising:
  assigning the subsequent events to one or more additional classification groups where attributes of the first event and attributes of the subsequent events are combined to meet entry criteria of the one or more additional classification groups; and
  applying an indication of membership in the one or more additional classification groups to the subsequent events.

24. The method of claim 16, wherein the user interface includes a display for viewing the classification groups and related configuration.

25. The method of claim 22, further comprising:
  modifying the stored indicia based on the analysis of the subsequent events; and
  modifying the classification group assignment of the subsequent events based on the analysis of the subsequent events.

26. The method of claim 25, wherein modifying the classification group assignment of the subsequent events includes adding the subsequent events to one or more additional classification groups, removing the subsequent events from one or more of the classification groups previously assigned to the subsequent events, or both.

27. The method of claim 26, wherein modifying the classification group assignment of the subsequent events includes modifying the indication of membership applied to the subsequent events.

28. The method of claim 22, wherein the context control block includes a finite state machine and a context.

29. The method of claim 1, wherein comparing attributes of the traffic flow with entry criteria of the classification groups comprises:
  identifying one or more characteristics associated with the traffic flow;
  comparing the identified characteristics to the entry criteria; and
  determining whether the identified characteristics match the entry criteria.

30. The method of claim 1, wherein the first network server and the second network server receive data associated with the classification groups and service definitions from a policy configuration server.

31. The method of claim 1, wherein the entry criteria of the classification groups include one or more of: rules for determining membership in the classification groups, parameters for determining membership in the classification groups, policies for determining membership in the classification groups, and patterns for determining membership in the classification groups.

32. The method of claim 1, wherein the attributes of the traffic flow include signaling data, media type data, media content data, state data, or any combination thereof.

33. The method of claim 1, wherein applying the indication of membership includes inserting, at the first network server, data associated with the indication of membership into the signaling content of the traffic flow.

34. The method of claim 1, wherein the classification groups are independent of each other.

35. The method of claim 1, further comprising:
  matching, at the second network server, the traffic flow to one or more additional classification groups based on the indication of membership; and
  identifying, at the second network server, one or more additional service definitions for the traffic flow based on the one or more additional classification groups assigned to the traffic flow at the second network server.

36. The method of claim 35, wherein one or more packets of the traffic flow include media content; and
  wherein the matching, at the second network server, further comprises deep packet inspection of the media content of the one or more packets of the traffic flow.

37. A system for applying service based on classification and grouping of traffic flows in a communication path between a first device and a second device, said communication path including a first network server and a second network server, the system comprising:
  a first network server comprising a processor coupled to a memory configured to:
    receive a traffic flow containing packets from the first device;
    match, the traffic flow to classification groups, wherein the matching comprises:
      comparing attributes of the traffic flow with entry criteria of the classification groups;
      assigning the traffic flow to one or more classification groups where the attributes of the traffic flow meet the entry criteria of the one or more classification groups;
      applying an indication of membership in the one or more classification groups to the traffic flow;
  a second network server comprising a processor coupled to a memory configured to:
    receive the traffic flow from the first network server;
    identify one or more service definitions for the traffic flow based on the indication of membership applied to the traffic flow at the first network server;
    provide a service to the traffic flow based on the one or more identified service definitions; and
    transmit the traffic flow to the second device.

38. The system of claim 37, wherein the second network server is further configured to reconcile the identified service definitions for the traffic flow.

* * * * *